(12) United States Patent
Zhang et al.

(10) Patent No.: US 8,456,711 B2
(45) Date of Patent: Jun. 4, 2013

(54) SUSAN-BASED CORNER SHARPENING

(75) Inventors: Yeqing Zhang, Penfield, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 817 days.

(21) Appl. No.: 12/609,475

(22) Filed: Oct. 30, 2009

(65) Prior Publication Data

US 2011/0102852 A1    May 5, 2011

(51) Int. Cl.
G06T 5/00 (2006.01)
H04N 1/46 (2006.01)

(52) U.S. Cl.
USPC .......................................... 358/3.27; 358/532

(58) Field of Classification Search
None
See application file for complete search history.

(56) References Cited

U.S. PATENT DOCUMENTS

| | | |
|---|---|---|
| 4,437,122 A | 3/1984 | Walsh et al. |
| 4,847,641 A | 7/1989 | Tung |
| 5,383,036 A | 1/1995 | Mailloux et al. |
| 5,459,828 A | 10/1995 | Zack et al. |
| 6,144,461 A | 11/2000 | Crean et al. |
| 6,167,166 A | 12/2000 | Loce et al. |
| 6,243,499 B1 | 6/2001 | Loce et al. |
| 6,678,414 B1 | 1/2004 | Loce et al. |
| 6,757,449 B1 | 6/2004 | Loce |
| 6,775,410 B1 | 8/2004 | Loce et al. |
| 7,518,618 B2 | 4/2009 | Loce et al. |
| 8,228,560 B2 * | 7/2012 | Hooper .................... 358/3.27 |
| 2004/0100483 A1 * | 5/2004 | Russell .................... 345/719 |
| 2004/0151250 A1 * | 8/2004 | Witterbrood et al. .... 375/240.16 |
| 2005/0129328 A1 | 6/2005 | Saber et al. |
| 2006/0262989 A1 * | 11/2006 | Tegenbosch et al. ......... 382/261 |
| 2006/0279749 A1 | 12/2006 | Zhang et al. |
| 2009/0303024 A1 * | 12/2009 | Asari ........................ 340/425.5 |

OTHER PUBLICATIONS

Smith et al., "SUSAN—A New Approach to Low Level Image Processing," International Journal of Computer Vision 23(1), 45-78 (1997).
Rubinstein et al., "Digital Typography: An Introduction to Type and Composition for Computer System Design," p. 78-79.

* cited by examiner

*Primary Examiner* — Barbara Reinier
(74) *Attorney, Agent, or Firm* — Fay Sharpe LLP (57) ABSTRACT

This closure provides image processing methods and apparatus for corner enhancing a digital image for rendering on an image output device. According to an exemplary method, the method determines whether or not image pixels are associated with a corner as a function of the USAN values generated for the image pixels. Subsequently, one or more pixels associated with a corner are modified to render a corner enhanced image.

25 Claims, 8 Drawing Sheets

SUSAN-BASED CORNER SHARPENING

CROSS REFERENCE TO RELATED PATENTS AND APPLICATIONS

The following patents and patent applications are incorporated herein by reference in their entirety.

U.S. Pat. No. 6,775,410, by Loce et al., entitled "IMAGE PROCESSING METHOD FOR SHARPENING CORNERS OF TEXT AND LINE ART," issued Aug. 10, 2004.

U.S. Patent Application Publication No. 2005/0129328, by Saber et al., entitled "CORNER SHARPENING OF TEXT AND LINE ART IN A SUPER RESOLUTION ANTI-ALIASING IMAGE PATH," published Jun. 16, 2005.

U.S. Patent Application Publication No. 2006/0279749, by Zhang et al., entitled "SUPER RESOLUTION ENCODING," published Dec. 14, 2006.

U.S. Pat. No. 6,167,166, by Loce et al., entitled "METHOD TO ENABLE THE RECOGNITION AND RENDERING OF ANTIALIASED IMAGES," issued Dec. 26, 2000.

U.S. Pat. No. 6,243,499, by Loce et al., entitled "TAGGING OF ANTIALIASED IMAGES," issued Jun. 5, 2001.

BACKGROUND

This disclosure relates to a methodology for improving the print quality of line-art corners and other fine details as found in both font and image data. Due to the nature of inks, paper and printing, these types of problems are well known in the printing arts.

In the printing arts this problem was typically overcome by manual image customization by hand of any troublesome detail areas. This was particularly the case with fonts or reusable type. For example, ink traps would be added to those areas in a font character where too much ink would otherwise collect and cause smearing. Similarly, detail areas would be sharpened to ensure the desired print result.

Figure 8:
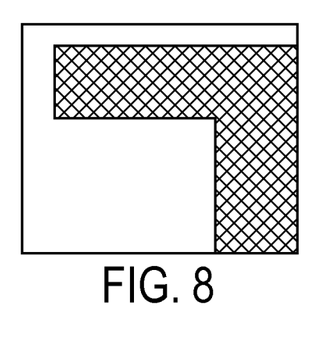
FIGS. 8, 9, and 10 depict prior art for corner sharpening.
Figure 9:
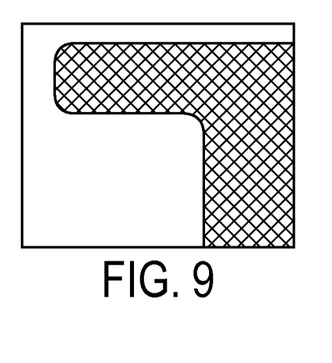
Figure 10:
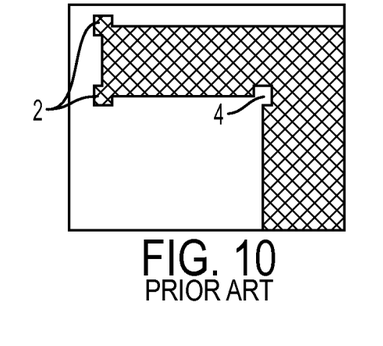

This approach of compensating to get a desired result such as sharpening has followed-on from the print arts into the digital imaging arts. As an example, Digital Typography: An Introduction to Type and Composition for Computer System Design, by Richard Rubinstein, discusses the desirability of compensating for electrostatic effects which result in toner not being placed on the paper exactly as the bit image specifies. Compensation is depicted there as adding to the image bit map to sharpen convex (outside) corners which would otherwise get rounded over. An alternative compensation is also depicted for handling situations involving concave (inside) corners by removing black printing pixels from the corner region of a shape to make an ink trap. In FIG. 8 there is depicted the bit image data and thereby the desired print image. In FIG. 9 is depicted the rounded-over result when printed on a given printer. FIG. 10 shows the bit image compensation which when printed will yield the desired result as depicted in FIG. 8 above. Note the ears 2 added to the outside corners and the ink trap 4 added to address the inside corner.

The following appear to be relevant to manipulation and enhancement of the edges of image shapes. They are incorporated by reference in their entirety for their teaching, particularly of template matching, and of bit map or signal substitution.

In U.S. Pat. No. 4,847,641 to Tung, print enhancement circuitry to enhance the printed image produced by a laser beam printer is interposed between the character generator circuits and the laser drive circuits to modify the laser drive signals provided by the character generator circuits. Bit data representing successive lines of the bit map for a desired image are stored in a first-in first-out (FIFO) buffer. The bit pattern sample window having a central cell (bit) and a selected (arbitrary) number of neighboring bits is compared to a number of matching bit patterns or templates, each of which is associated with an error element or cell. When a logic matching network detects a match, a modification signal associated with a unique compensation cell (bit) is generated. The sample window central bit is then replaced (modified) with the unique compensation bit required by the matching template. In this manner, all bits in a desired bit map, or set of bit maps, are examined and their corresponding laser drive signals modified to compensate for the errors associated with the matched templates in a piece-wise manner.

In U.S. Pat. No. 5,383,036 to Mailloux et al., a method for enhancing the contour fidelity of printed images of two or more colors is described, which includes obtaining a digital representation of the color image and finding color separations of each color. Each color separation is enhanced by a single set of inverse symmetrical templates, the set including templates in which the second template is always the inverse of the first, and the third and fourth templates are 180 degree rotations of the first two. The resulting smoothed color separations are recombined into an enhanced image without separation error.

U.S. Pat. No. 4,437,122 to Walsh et al. discloses methods to enhance the resolution and quality of characters of a system receiving the information initially in the form of video display pixels and providing hard copy output. This is accomplished by storing at least three successive lines of video data in successive, parallel connected shift registers, applying the outputs of the shift registers to a decoder, and generating driving signals for the printer head. The decoder compares the pixels on the same line as well as in preceding and succeeding lines that surround each specific input pixel to generate the printer head driving signals according to whether straight or curved line segments are to be formed. In effect, the printer increases the density of the information elements and simultaneously provides rounding off of character edges and smoothing of diagonals.

There exists a need for techniques which will solve the problem of corner rounding in an automated and parameterized process which is relatively easy to optimize.

INCORPORATION BY REFERENCE

The following patents and publications are incorporated herein by reference in their entirety.

U.S. Pat. No. 6,678,414, by Loce et al., entitled "Loose-Gray-Scale Template Matching," issued Jan. 13, 2004.

U.S. Pat. No. 4,847,641, by Tung, entitled "Piece-Wise Print Image Enhancement for DOT Matrix Printers," issued Jul. 11, 1989.

U.S. Pat. No. 5,383,036, by Mailoux et al., entitled "Enhancement of Multiple Color Images Without Color Separation Error by Inverse Symmetrical Template Matching," issued Jan. 17, 1995.

U.S. Pat. No. 4,437,122, by Walsh et al., entitled "Low Resolution Raster Images," issued Mar. 13, 1984.

"SUSAN—A New Approach to Low Level Image Processing," Stephen M. Smith, J. Michael Brady, International Journal of Computer Vision 23(1), 45-78 (1997).

Digital Typography: An Introduction to Type and Composition for Computer System Design, p 78-79, Richard Rubinstein, Addison-Wesley, 1988.

BRIEF DESCRIPTION

According to one embodiment of this disclosure, disclosed is an image processing method for corner enhancing a digital image received by an image processing system for rendering on an image output device, the method comprising a) receiving a digital image including a plurality of pixels representing an image to be rendered on the image output device b) selecting a portion of the digital image for corner detection, the portion including a plurality of pixels; c) selecting a target pixel within the selected portion; d) calculating the USAN associated with the target pixel within a first window including the target pixel, the first window defined as a predetermined area of pixels within the selected portion of the digital image; e) performing steps f) and g) for a plurality of target pixels within the selected portion of the digital image to generate a plurality of USAN values associated with the respective plurality of target pixels; f) determining that one or more of the plurality of target pixels are corner pixels as a function of the USAN values generated for the respective target pixels; and g) modifying one or more of the corner pixels, pixels adjacent to the corner pixels and pixels substantially near the corner pixels to generate a corner enhanced digital image which renders an image with enhanced corners on the image output device relative to the digital image received by the image processing system.

In accordance with another embodiment of this disclosure, described is a computer program product comprising a computer-usable data carrier storing instructions that, when executed by a computer, cause the computer to perform an image processing method for corner enhancing a digital image received by an image processing system for rendering on an image output device, the method comprising a) receiving a digital image including a plurality of pixels representing an image to be rendered on the image output device b) selecting a portion of the digital image for corner detection, the portion including a plurality of pixels; c) selecting a target pixel within the selected portion; d) calculating the USAN associated with the target pixel within a first window including the target pixel, the first window defined as a predetermined area of pixels within the selected portion of the digital image; e) performing steps c) and d) for a plurality of target pixels within the selected portion of the digital image to generate a plurality of USAN values associated with the respective plurality of target pixels; f) determining that one or more of the plurality of target pixels are corner pixels as a function of the USAN values generated for the respective target pixels; and g) modifying one or more of the corner pixels, pixels adjacent to the corner pixels and pixels substantially near the corner pixels to generate a corner enhanced digital image which renders an image with enhanced corners on the image output device relative to the digital image received by the image processing system.

In a further embodiment of this disclosure, described is a printing apparatus comprising an image marking device for rendering a color image on a media substrate; and a controller configured to receive a digital image for printing on the image marking device, the controller configured to execute instructions to perform an image processing method for corner enhancing the digital image received by the controller, the method comprising a) receiving a digital image including a plurality of pixels representing an image to be rendered on the image output device b) selecting a portion of the digital image for corner detection, the portion including a plurality of pixels; c) selecting a target pixel within the selected portion; d) calculating the USAN associated with the target pixel within a first window including the target pixel, the first window defined as a predetermined area of pixels within the selected portion of the digital image; e) performing steps c) and d) for a plurality of target pixels within the selected portion of the digital image to generate a plurality of USAN values associated with the respective plurality of target pixels; f) determining that one or more of the plurality of target pixels are corner pixels as a function of the USAN values generated for the respective target pixels; and g) modifying one or more of the corner pixels, pixels adjacent to the corner pixels and pixels substantially near the corner pixels to generate a corner enhanced digital image which renders an image with enhanced corners on the image output device relative to the digital image received by the image processing system.

DETAILED DESCRIPTION

This disclosure provides novel corner sharpening methods and apparatus based on a modification of the SUSAN (Smallest Univalue Segment Assimilating Nucleus) algorithm for corner detection. See "SUSAN—A New Approach to Low Level Image Processing," Stephen M. Smith, J. Michael Brady, International Journal of Computer Vision 23(1), 45-78 (1997). The proposed method is comprised of three key steps: (1) CUV (Count Uniform Values), which computes each pixel's USAN area by counting how many surrounding pixels, within a specified window, match the value of the current pixel of interest; (2) CID (Corner Identification), which determines if the count value indicates that the target pixel is corner or serif pixel, and if so, sets a tag or indicator that specifies sharpening about that pixel; and (3) CSE (Corner Serif Enhancement), which alters pixels surrounding the target pixel if the tag state indicates the presence of a corner. The method is relatively simple, easy to optimize, can differentiate between corners of different sharpness, and identifies corners at any angle.

Corner rounding defects and compensating digital image structures are well-known in the field of electrostatic printing of digital typography and can be explained in the following quote: " . . . various electrostatic effects result in toner's not being placed on the paper exactly as the bit image specifies, . . . . Consider a sharp convex part of a black image. Instead of producing a sharp corner, a rounded corner results. The solution is to make the [bit image] corner sharper than the desired result, resulting in a more accurate [printed] image. Exactly the reverse happens with concave sections; compensation will also restore these images to the correct shape." Digital Typography: An Introduction to Type and Composition for Computer System Design, p. 78-79, Richard Rubinstein, Addison-Wesley, 1988.

Image enhancement processes exist to generate image structures to address the following:
Suppress jaggies
Enlarge or shrink ink traps
Round out corners that were squared off by coarse digitization
Lengthen and sharpen serif tips
Thicken or thin strokes
Clean various forms of noise
Modify halfbit structures.

Notably, methods for generating precompensated sharp corners are disclosed in U.S. Pat. No. 6,775,410, by Loce et al., entitled "Image Processing Method for Sharpening Corners of Text and Line Art," issued Aug. 10, 2004 and U.S. Patent Application Publication No. 2005/0129328, by Saber et al., entitled "Corner Sharpening Of Text And Line Art In A Super Resolution Anti-Aliasing Image Path," published Jun. 16, 2005. This disclosure provides methods and apparatus for generating image structures sometimes known conventionally as sharpened corners.

SUSAN Principle

Figure 1:
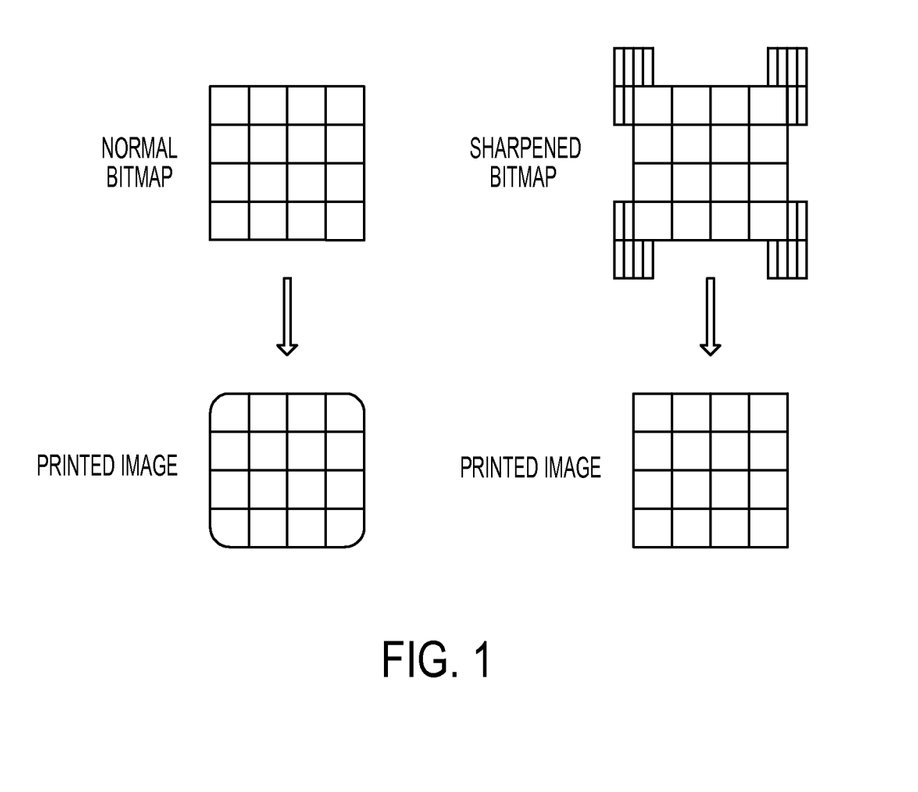
FIG. 1 is schematics of printing with unenhanced and enhanced corners.
Figure 2:
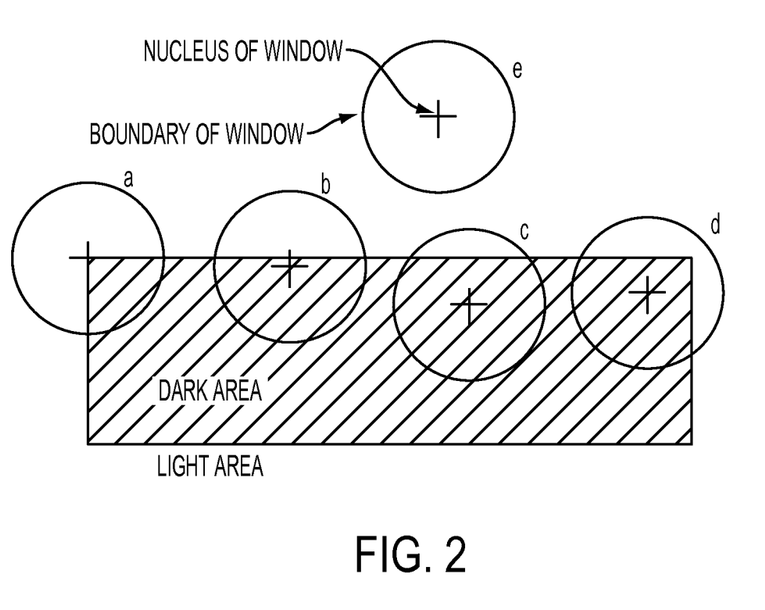
FIG. 2 illustrates five circular windows at different locations in an image according to an exemplary embodiment of this disclosure.
Figure 3:
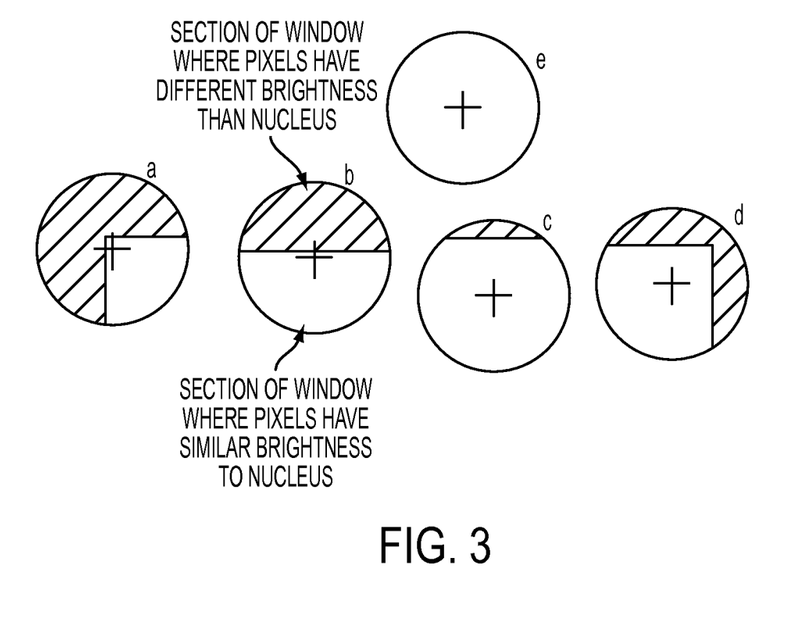
FIG. 3 illustrates the USANs associated with the five circular windows of FIG. 2.
Figure 4:
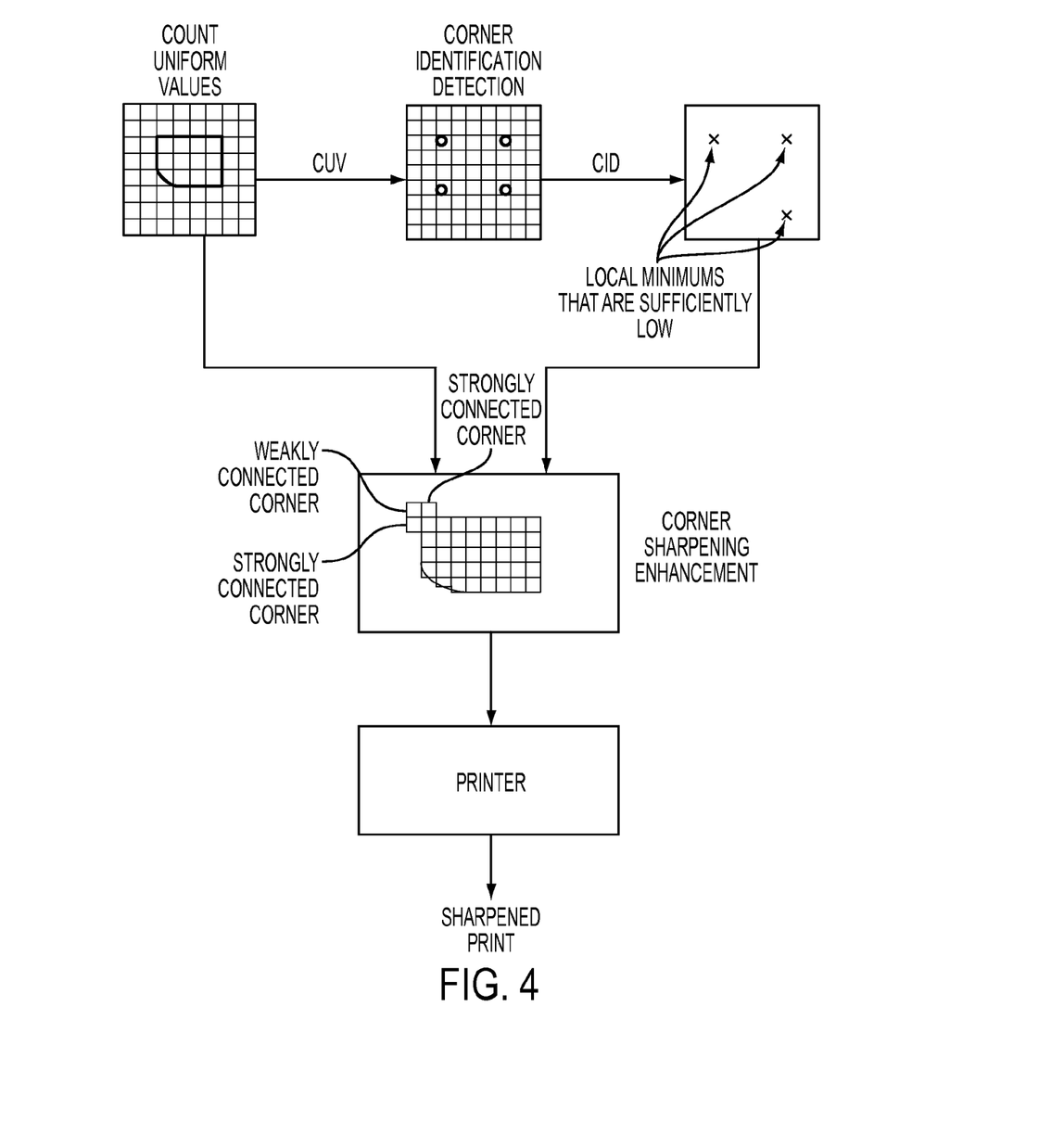
FIG. 4 is a block diagram of an image processing method for corner enhancement according to an exemplary embodiment of this disclosure.

The SUSAN (Smallest Univalue Segment Assimilating Nucleus) algorithm, developed by S. M. Smith and J. M. Brady, see "SUSAN—A New Approach to Low Level Image Processing," Stephen M. Smith, J. Michael Brady, International Journal of Computer Vision 23(1), 45-78 (1997), is an image feature detection algorithm that is based on non-linear filtering. The basis of the SUSAN principle is the concept that each image point has associated with it a local area of similar brightness. FIG. 2 shows an image of a dark rectangle on a white background and a circular observation window shown centered about five target pixel locations. The target pixel of the window is referred to as the "nucleus." If the brightness of each pixel within a window is compared to the brightness of the window nucleus, then an area of the window can be defined that has the same (or similar) brightness as the nucleus. This similar area within the window is referred to as the "USAN" (Univalue Segment Assimilating Nucleus). In FIG. 3, each window location from FIG. 2 is depicted with its USAN shown in white. The USAN contains much information about the structure of the image. As can be seen from FIGS. 2 and 3, the USAN area is at a maximum when the nucleus lies in a flat region of the image surface. The USAN area falls to half of this maximum very near a straight edge, and falls even further when inside a corner. It is this property of the USAN area that is used as the main determinant of the presence of edges and two dimensional features, such as corners. Note that FIGS. 2 and 3 are representative of figures illustrated in "SUSAN—A New Approach to Low Level Image Processing," Stephen M. Smith, J. Michael Brady, International Journal of Computer Vision 23(1), 45-78 (1997), and are not intended to limit the shape or size of the window used in the corner detection operation.

General

The present disclosure and embodiments included herein provide corner sharpening methods and apparatus based on the SUSAN (Smallest Univalue Segment Assimilating Nucleus) algorithm for corner detection. As previously stated, the disclosed method is substantively comprised of three key steps: (1) CUV (Count Uniform Values), which computes each pixel's USAN area by counting how many surrounding pixels, within a specified window, match the value of the current pixel of interest (target pixel); (2) CID (Corner Identification), which determines if the count value indicates that the target pixel is a corner pixel, and if so, sets a tag or indicator that specifies sharpening about that pixel; (3) CSE (Corner Serif Enhancement), which alters pixels surrounding the target pixel if the tag state indicates the presence of a corner.

Advantages associated with the disclosed method may include simplicity, ease of optimization, differentiating between corners of different sharpness, and identifying corners at any angle. For example, "Y" and "X" junctions are not easily dealt with by other corner detection algorithms, but are well recognized and modified by the presently disclosed methods. The SUSAN corner detector uses no image derivatives, so its performance in the presence of noise is good, thereby making it suitable for scanned text as well as orthographic text. The integration of individual pixel values in the calculation of USAN areas further reduces the effect of noise.

Details of the SUSAN-Based Corner Sharpening Method

Two primary steps associated with the disclosed method include: (1) corner detection and (2) corner modification. Corner detection can be further divided into two steps of the SUSAN-like process.

CUV (Count Uniform Values): This operation calculates each pixel's USAN area by counting how many surrounding pixels, within a specified CUV window, match the value of the current pixel of interest. Equation (1) determines the comparison, where $\vec{r}_0$ is the position of the nucleus in the two-dimensional image, $\vec{r}$ is the position of any other pixel within the CUV window, $I(\vec{r})$ is the brightness of pixel $\vec{r}$, $I(\vec{r}_0)|$ is the brightness of pixel $\vec{r}_0$, t is the brightness difference threshold and c is the output of the comparison. This comparison is performed for each pixel within the window, and the corresponding USAN area n of the target pixel is calculated with Equation (2).

$$c(\vec{r}, \vec{r}_0) = \begin{cases} 1 & \text{if } |I(\vec{r}) - I(\vec{r}_0)| \le t \\ 0 & \text{if } |I(\vec{r}) - I(\vec{r}_0)| > t, \end{cases} \quad (1)$$

$$n(\vec{r}_0) = \sum_{\vec{r}} c(\vec{r}, \vec{r}_0). \quad (2)$$

For identification of binary [1,0] text, the comparison is a simple check for a difference. The test is equally simple for saturated text on a white background [0,255]. The actual differencing of Equation (1) becomes more relevant for anti-aliased text, which possesses gray edges, scanned text, and tinted background or text. Appropriate thresholds are found for each application. The USAN value for the specific pixel of interest can be temporarily stored in an image buffer, such as the omega channel of an image.

CID (Corner Identification): This operation determines if the count value, produced from the CUV, for a current pixel of interest is the smallest count value of all count values in a specified CID window and below one or more selected thresholds. If the pixel of interest has the smallest count within the specified CID window, this indicates that the pixel of interest is either an edge or corner, a corner including, but not limited to, the tip of a serif, an ink trap and the corner of a sans serif stroke (e.g., right angle corner). If the count is below a threshold, then the pixel of interest is estimated to be some type of corner structure. For instance, if the specified CID window is 5×5 in dimension and the pixel of interest is a minimum count of 9, it is very probable that the pixel is a tip of a right angle corner. If the count is a minimum and much less than 9, then it is very likely that the pixel is the tip of a serif. More than one threshold can be examined to indicate the sharpness of the corner. For right angles, under ideal conditions, the corner pixel should have a count of $(N/2-1)^2$ for an N×N window, which can be used as a threshold. If minimum counts are less than 60% of that value, it is likely that the pixel is the tip of a serif.

For some physical processes, it may be desirable to identify pixels that are just outside the tip of a corner. In this case, the CID logic is based on maximum values in the window. Note that an alternative for this scenario is to invert the pixel values and use a minimum.

Note that the CID window size must be smaller than the window size specified in the CUV module, and the shape and size of the CUV and CID windows can be optimized by processing candidate window shapes and sizes, and noting the success and failure rates for those windows.

The CID module may write a value in a buffer such as the omega channel of the output image to indicate the pixel is a corner.

CSE (Corner/Serif Enhancement): This operation utilizes the corner and serif identifiers found in step 2, above, to modify pixel values about the corners. For instance, this step can operate by examining the omega channel of the CID output to determine if the current pixel of interest is a corner or not. If the current pixel of interest is a corner, the CSE alters its surrounding pixels to enhance the corner/serif. The number of pixels and the shape of the alteration are user-defined. Also, the alteration can be performed with morphological/Boolean operations, such as dilations for outside corners and erosions for inside corners, where the structuring element shape is optimized based on empirical tests on bit maps and print tests with the given marking process. For example, if a corner pixel is black (pixel value=1 for a binary system or 255 for an 8 bit system) perform an erosion operation to create an ink trap. If a corner pixel is white (pixel value=ø) perform a dilation operation to extend the corner.

Additional optimization of the structuring elements can be performed by utilizing elements that are preferred for particular corner orientations or original sharpness. For instance, corner orientation can be determined by examining the slope of a region of CUV values that correspond to a region of the image. The sharpness of the original corner can be determined by the magnitude of the CUV values e.g., smaller values for an outside corner can indicate a serif rather than a right angle corner, which are sharpened differently.

Image Path Considerations

There are several possible image path embodiments of the presently disclosed corner sharpening method.

For an image path that employs tags, the tagging and enhancement can be applied within one module, or by modules at different points in the image path. For instance, the tagging can be performed in the Digital Front End (DFE), and the enhancement step can be downstream in the print engine.

Figure 5:
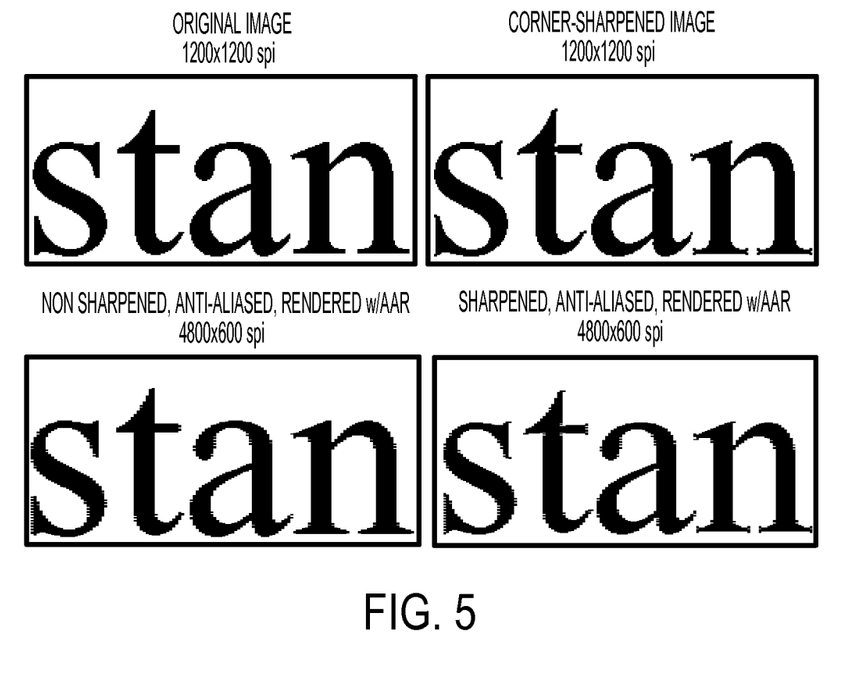
FIG. 5 illustrates an example of the disclosed corner enhancement as applied to 10 Point Times New Roman font.
Figure 6:
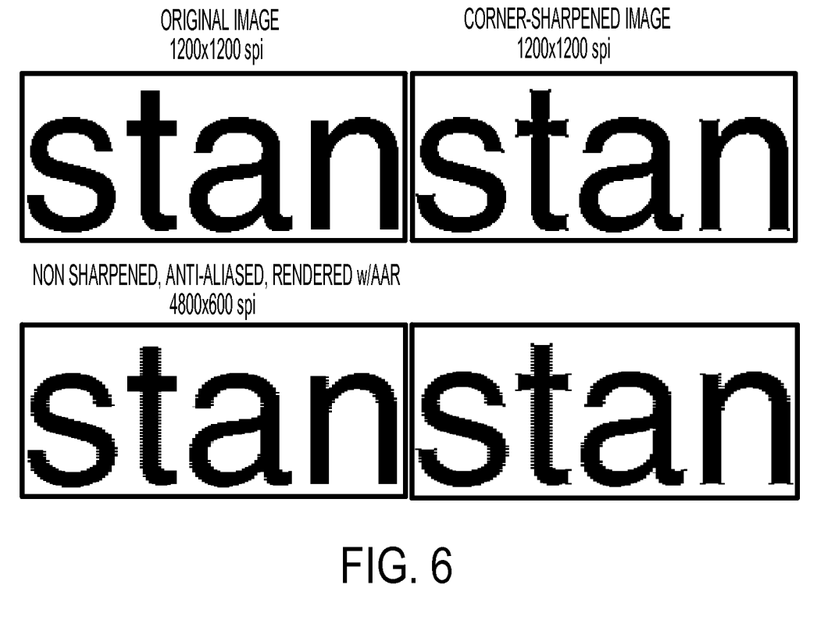
FIG. 6 illustrates another example of the disclosed corner enhancement as applied to 8 Point Helvetica font.
Figure 7:
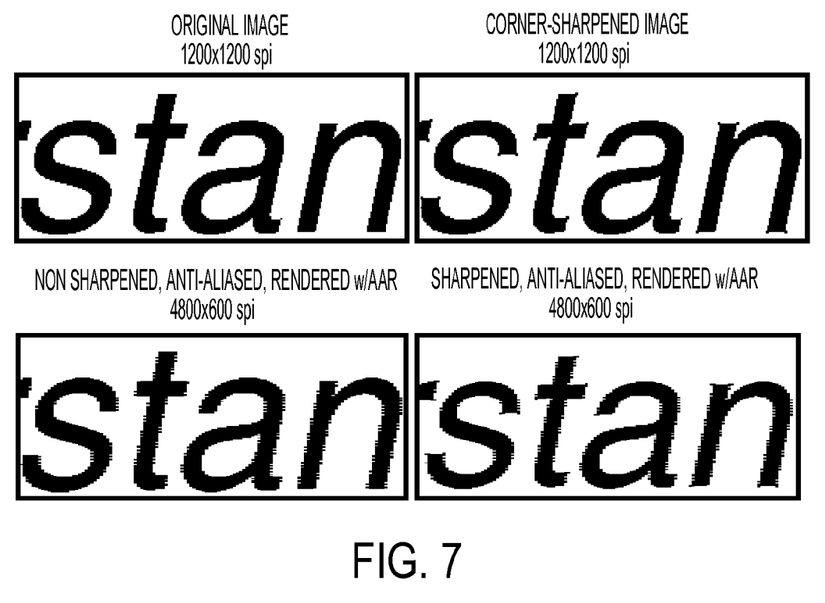
FIG. 7 illustrates another example of the disclosed corner enhancement as applied to 8 Point Helvetica Italic font.

In a system that does not have the complication of anti-aliasing (AA), the image can be received at a resolution such as 1200 spi, processed through the 3 steps using simple bi-level operations, and output an image with sharpened corners at 1200 spi or a higher resolution. Results of this embodiment are shown the upper right image of FIGS. 5, 6, and 7.

An image path that employs super resolution AA can perform the recognition and enhancement prior to the averaging AA step. Rendering modules in the print engine, for example anti-aliased tagging (AAT) and Anti-aliased rendering (AAR), can reconstruct the corner sharpening structures that were turned to gray in the AA step. Results of this embodiment are shown in the lower right image of FIGS. 5, 6, and 7 for 1200 spi super resolution and 4800×600 raster output scanner (ROS) resolution.

Some image paths employ super resolution encoding (SRE) and super resolution decoding (SRD), as further described in U.S. Patent Publication No. 2006/0279749 and U.S. Pat. No. 6,020,979]. In such a path the recognition and enhancement can be performed in the DFE prior to the SRE step. Rendering in the print engine via SRD can reconstruct the corner sharpening structures that were encoded in the DFE. Results of this embodiment are the same as the bi-level case, which are shown the upper-right image of FIGS. 5, 6, and 7.

The disclosed SUSAN-Based corner sharpening techniques have been implemented as three individual modules that can be piped together to produce a desired result. Examination of the bitmaps and image proofer prints show very positive results, even for very difficult small text. Examples are given below in FIGS. 5-7. In these particular examples, the input image resolution is 1200 spi, which is used by DocuSP when anti-aliasing can be an option SRE/SRD. The output resolution is 1200×1200 (upper right) and 4800×600 (lower right) for an image path with AA/AAT/AAR.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An image processing method for corner enhancing a digital image received by an image processing system for rendering on an image output device, the method comprising:
    a) receiving a digital image including a plurality of pixels representing an image to be rendered on the image output device;
    b) selecting a portion of the digital image for corner detection, the portion including a plurality of pixels;
    c) selecting a target pixel within the selected portion;
    d) calculating the USAN associated with the target pixel within a first window including the target pixel, the first window defined as a predetermined area of pixels within the selected portion of the digital image;
    e) performing steps c) and d) for a plurality of target pixels within the selected portion of the digital image to generate a plurality of USAN values associated with the respective plurality of target pixels; and
    f) determining that one or more of the plurality of target pixels are corner pixels as a function of the USAN values generated for the respective target pixels; and
    g) modifying one or more of the corner pixels, pixels adjacent to the corner pixels and pixels substantially near the corner pixels to generate a corner enhanced digital image which renders an image with enhanced corners on the image output device relative to the digital image received by the image processing system.

2. The image processing method according to claim 1, step f) comprising:
    f1) determining target pixels with the lowest USAN values within a second window, the second window defined as a predetermined area of pixels less than the area of pixels associated with the first window;
    f2) defining target pixels with the lowest USAN values as corner pixels.

3. The image processing method according to claim 2, step f) comprising:
iteratively performing steps f1) and f2) to cover the selected portion of the digital image, wherein the second window covers a different set of pixels for each performance of step f1).

4. The image processing method according to claim 2), step f2) comprising:
defining target pixels with the lowest USAN values which are less than a predetermined threshold value as corner pixels.

5. The image processing method according to claim 4, wherein a plurality of predetermined threshold values are used to associate a relative sharpness with the corner pixels.

6. The image processing method according to claim 1, step g) comprising:
performing one of growing and shrinking a corner associated with the corner pixel.

7. The image processing method according to claim 1, further comprising:
performing anti-aliasing on the corner enhanced digital image; and
reconstructing one or more portions of the anti-aliased digital image to include corner-enhanced structures associated with the modified pixels of step g).

8. The image processing method according to claim 1, further comprising:
performing super resolution encoding (SRE) on the corner enhanced digital image; and
performing super resolution decoding on encoded corner enhanced digital image to reconstruct the corner enhanced structures associated with the modified pixels of step g).

9. The image processing method according to claim 1, wherein the corner pixels determined in step f) are associated with one of the tip of a serif, an ink trap, and the corner of a sans serif stroke.

10. The image processing method according to claim 1, wherein step g) performs one or more of
an erosion operation to create an ink trap if a corner pixel is associated with black; and
a dilation operation to extend the corner if a corner pixel is associated with white.

11. The image processing method according to claim 1, further comprising:
setting a value in an omega channel of the digital image to associate a pixel with a corner.

12. The image processing method according to claim 2, step f2) comprising:
associating target pixels with USAN values less than 60% of the second window as the tip of a serif; and
step g) comprising:
applying serif sharpening to any target pixels associated with the tip of a serif.

13. A computer program product comprising a computer-usable non-transitory data carrier storing instructions that, when executed by a computer, cause the computer to perform an image processing method for corner enhancing a digital image received by an image processing system for rendering on an image output device, the method comprising:
a) receiving a digital image including a plurality of pixels representing an image to be rendered on the image output device;
b) selecting a portion of the digital image for corner detection, the portion including a plurality of pixels;
c) selecting a target pixel within the selected portion;
d) calculating the USAN associated with the target pixel within a first window including the target pixel, the first window defined as a predetermined area of pixels within the selected portion of the digital image;
e) performing steps c) and d) for a plurality of target pixels within the selected portion of the digital image to generate a plurality of USAN values associated with the respective plurality of target pixels;
f) determining that one or more of the target pixels are corner pixels as a function of the USAN values generated for the respective target pixels; and
g) modifying one or more of the corner pixels, pixels adjacent to the corner pixels and pixels substantially near the corner pixels to generate a corner enhanced digital image which renders an image with enhanced corners on the image output device relative to the digital image received by the image processing system.

14. The computer program product according to claim 13, step f) comprising:
f1) determining target pixels with the lowest USAN values within a second window, the second window defined as a predetermined area of pixels less than the area of pixels associated with the first window;
f2) defining target pixels with the lowest USAN values as corner pixels.

15. The computer program product according to claim 14, step f) comprising:
iteratively performing steps f1) and f2) to cover the selected portion of the digital image, wherein the second window covers a different set of pixels for each performance of step f1).

16. The computer program product according to claim 14, step f2) comprising:
defining target pixels with the lowest USAN values which are less than a predetermined threshold value as corner pixels.

17. A printing apparatus comprising:
an image marking device for rendering a color image on a media substrate; and
a controller configured to receive a digital image for printing on the image marking device, the controller configured to execute instructions to perform an image processing method for corner enhancing the digital image received by the controller, the method comprising:
a) receiving a digital image including a plurality of pixels representing an image to be rendered on the image output device:
b) selecting a portion of the digital image for corner detection, the portion including a plurality of pixels;
c) selecting a target pixel within the selected portion;
d) calculating the USAN associated with the target pixel within a first window including the target pixel, the first window defined as a predetermined area of pixels within the selected portion of the digital image;
e) performing steps c) and d) for a plurality of target pixels within the selected portion of the digital image to generate a plurality of USAN values associated with the respective plurality of target pixels;
f) determining that one or more of the target pixels are corner pixels as a function of the USAN values generated for the respective target pixels; and
g) modifying one or more of the corner pixels, pixels adjacent to the corner pixels and pixels substantially near the corner pixels to generate a corner enhanced digital image which renders an image with enhanced corners on the image output device relative to the digital image received by the image processing system.

18. The printing apparatus according to claim 17, step f) comprising:
- f1) determining target pixels with the lowest USAN values within a second window, the second window defined as a predetermined area of pixels less than the area of pixels associated with the first window;
- f2) defining target pixels with the lowest USAN values as corner pixels.

19. The printing apparatus according to claim 18, step f) comprising:
iteratively performing steps f1) and f2) to cover the selected portion of the digital image, wherein the second window covers a different set of pixels for each performance of step f1).

20. The printing apparatus according to claim 18, step f) comprising:
defining target pixels with the lowest USAN values which are less than a predetermined threshold value as corner pixels.

21. The printing apparatus according to claim 18, wherein a plurality of predetermined threshold values are used to associate a relative sharpness with the corner pixels.

22. The printing apparatus according to claim 17, step g) comprising:
performing one of growing and shrinking a corner associated with the corner pixel.

23. The printing apparatus according to claim 17, the method further comprising:
- performing anti-aliasing on the corner enhanced digital image; and
- reconstructing one or more portions of the anti-aliased digital image to include corner enhances structures associated with the modified pixels of step g).

24. The printing apparatus according to claim 17, the method further comprising:
- performing super resolution encoding (SRE) on the corner enhanced digital image; and
- performing super resolution decoding on encoded corner enhanced digital image to reconstruct the corner enhanced structures associated with the modified pixels of step g).

25. The printing apparatus according to claim 17, wherein the corner pixels determined in step f) are associated with one of the tip of a serif, an ink trap, and the corner of a sans serif stroke.

* * * * *